(12) United States Patent
Branton et al.

(10) Patent No.: US 10,764,352 B2
(45) Date of Patent: Sep. 1, 2020

(54) CONTEXT AWARE BROWSER POLICY

(71) Applicant: Ivanti US LLC, South Jordan, UT (US)

(72) Inventors: Paul Keith Branton, Rochdale (GB); Darren Robert Boyce, Cheshire (GB)

(73) Assignee: Ivanti US LLC, South Jordan, UT (US)

( * ) Notice: Subject to any disclaimer, the term of this patent is extended or adjusted under 35 U.S.C. 154(b) by 198 days.

(21) Appl. No.: 15/910,456

(22) Filed: Mar. 2, 2018

(65) Prior Publication Data

US 2018/0227353 A1 Aug. 9, 2018

Related U.S. Application Data

(63) Continuation of application No. 14/243,040, filed on Apr. 2, 2014, now Pat. No. 9,912,720, which is a
(Continued)

(51) Int. Cl.
*H04L 29/08* (2006.01)
*H04L 12/24* (2006.01)

(52) U.S. Cl.
CPC .......... *H04L 67/02* (2013.01); *H04L 41/0893* (2013.01); *H04L 67/125* (2013.01); *H04L 41/0856* (2013.01); *H04L 41/0863* (2013.01)

(58) Field of Classification Search
CPC ... H04L 67/125; H04L 67/02; H04L 41/0893; H04L 41/0863; H04L 41/0856
See application file for complete search history.

(56) References Cited

U.S. PATENT DOCUMENTS 7,231,661 B1 6/2007 Villavicencio et al.
7,296,235 B2 11/2007 Bhat et al.
(Continued)

FOREIGN PATENT DOCUMENTS

WO WO 2002/031685 4/2002
WO WO 2005/091107 9/2005
(Continued)

OTHER PUBLICATIONS

United Kingdom Search Report issued by the United Kingdom Intellectual Property Office for Application No. GB1408483.4 dated Dec. 3, 2014, 4 pages.
(Continued)

*Primary Examiner* — Nicholas R Taylor
*Assistant Examiner* — Sanjoy Roy

(57) ABSTRACT

Systems and methods for a web event framework include receiving at a framework plugin an event from a web browser, wherein the framework plugin is coupled to the web browser, generating, by the framework plugin, a framework event based on the event, forwarding the framework event to a framework server coupled to the framework plugin, receiving at the framework server the framework event from the framework plugin, determining, at the framework server, a framework action based on the framework event and a framework policy, forwarding the framework action to the framework plugin, and executing the framework action by the framework plugin, wherein executing the framework action includes modifying one or more settings for the web browser, wherein the modified settings are based on the framework policy and sending an instruction to the web browser to cause the web browser to reload at least one web page under the modified settings.

19 Claims, 9 Drawing Sheets

Related U.S. Application Data continuation-in-part of application No. 13/892,678, filed on May 13, 2013, now Pat. No. 10,291,615.

(56) References Cited

U.S. PATENT DOCUMENTS

| | | | |
|---|---|---|---|
| 7,353,375 | B2 | 4/2008 | Cepulis |
| 7,711,832 | B1 | 5/2010 | Champion et al. |
| 7,865,931 | B1 | 1/2011 | Stone et al. |
| 7,937,755 | B1 | 5/2011 | Guruswamy |
| 8,863,001 | B2 * | 10/2014 | Kim .......................... G06F 8/61 715/738 |
| 9,167,052 | B2 | 10/2015 | Branton et al. |
| 9,900,367 | B2 | 2/2018 | Branton |
| 9,912,720 | B2 | 3/2018 | Branton et al. |
| 2002/0065955 | A1 | 5/2002 | Gvily |
| 2003/0101235 | A1 | 5/2003 | Zhang |
| 2004/0003043 | A1 | 1/2004 | Rajamony et al. |
| 2004/0128389 | A1 | 7/2004 | Kopchik |
| 2005/0021978 | A1 | 1/2005 | Bhat et al. |
| 2005/0229104 | A1 | 10/2005 | Franco et al. |
| 2006/0080523 | A1 | 4/2006 | Cepulis |
| 2006/0130139 | A1 | 6/2006 | Sobel et al. |
| 2006/0212514 | A1 | 9/2006 | Saillet |
| 2006/0224967 | A1 * | 10/2006 | Marmaros ........... G06F 16/9562 715/738 |
| 2006/0288083 | A1 * | 12/2006 | Ueda .................... G06F 9/4843 709/217 |
| 2007/0015521 | A1 | 1/2007 | Casey |
| 2007/0198525 | A1 | 8/2007 | Chatterjee et al. |
| 2008/0172382 | A1 | 7/2008 | Prettejohn |
| 2008/0229288 | A1 | 9/2008 | Nelson et al. |
| 2008/0289029 | A1 * | 11/2008 | Kim ...................... G06Q 10/06 726/12 |
| 2008/0307340 | A1 * | 12/2008 | Kojima ................ G06F 16/957 715/764 |
| 2008/0307506 | A1 | 12/2008 | Saldhana |
| 2009/0241143 | A1 | 9/2009 | White et al. |
| 2010/0077444 | A1 * | 3/2010 | Forristal .............. G06F 21/577 726/1 |
| 2010/0153836 | A1 * | 6/2010 | Krassner ................ H04L 67/36 715/234 |
| 2010/0211796 | A1 | 8/2010 | Gailey et al. |
| 2010/0313252 | A1 | 12/2010 | Trouw |
| 2011/0138059 | A1 | 6/2011 | Schleifer et al. |
| 2011/0247045 | A1 | 10/2011 | Rajagopal et al. |
| 2012/0159145 | A1 | 6/2012 | Cheong et al. |
| 2013/0086020 | A1 | 4/2013 | Addala |
| 2013/0145361 | A1 | 6/2013 | Kaegi |
| 2013/0167045 | A1 * | 6/2013 | Xu ...................... G06F 21/6263 715/760 |
| 2013/0185362 | A1 | 7/2013 | Clagg et al. |
| 2014/0189804 | A1 | 7/2014 | Lehmann et al. |
| 2014/0207863 | A1 | 7/2014 | Steinberg et al. |
| 2014/0208397 | A1 | 7/2014 | Peterson |
| 2014/0337495 | A1 | 11/2014 | Branton et al. |
| 2014/0337511 | A1 | 11/2014 | Branton et al. |
| 2014/0337743 | A1 | 11/2014 | Branton |

FOREIGN PATENT DOCUMENTS

| | | |
|---|---|---|
| WO | WO 2010/039505 | 4/2010 |
| WO | WO 2013/109450 | 7/2013 |

OTHER PUBLICATIONS

United Kingdom Search Report issued by the United Kingdom Intellectual Property Office for Application No. GB1408468.5 dated Oct. 27, 2014, 4 pages.

United Kingdom Search Report issued by the United Kingdom Intellectual Property Office for Application No. GB1408457.8 dated Nov. 25, 2014, 3 pages.

Office Action for U.S. Appl. No. 13/892,678, dated Dec. 12, 2017, 31 pages.

Office Action for U.S. Appl. No. 13/892,678, dated Aug. 14, 2017, 30 pages.

Office Action for U.S. Appl. No. 13/892,678, dated Apr. 3, 2017, 32 pages.

Office Action for U.S. Appl. No. 13/892,678, dated Sep. 9, 2016, 28 pages.

Office Action for U.S. Appl. No. 13/892,678, dated May 21, 2015, 27 pages.

Office Action for U.S. Appl. No. 13/892,678, dated Dec. 31, 2015, 30 pages.

Office Action for U.S. Appl. No. 14/132,307, dated Nov. 8, 2016, 23 pages.

Office Action for U.S. Appl. No. 14/132,307, dated Jun. 19, 2015, 26 pages.

Office Action for U.S. Appl. No. 14/132,307, dated Apr. 27, 2017, 26 pages.

Office Action for U.S. Appl. No. 14/132,307, dated Feb. 5, 2016, 27 pages.

Office Action for U.S. Appl. No. 14/243,040, dated Mar. 21, 2017, 23 pages.

Office Action for U.S. Appl. No. 14/243,040, dated Nov. 21, 2016, 20 pages.

Office Action for U.S. Appl. No. 14/243,040, dated Feb. 11, 2016, 28 pages.

Office Action for U.S. Appl. No. 14/243,040, dated Jun. 5, 2015, 26 pages.

"AutoHotkey," Retrieved from the Internet: <http://www.autohotkey.com>, Retrieved on on May 5, 2014, 2 pages.

"Browser extension," Retrieved from the Internet: <http://en.wikipedia.org/w/index.php?title=browser_extension&printable=yes>, Retrieved on May 8, 2013, 3 pages.

AppSense, "DesktopNow: Simplify the management of any Windows desktop, physical or virtual, while increasing IT control and user productivity," Retrieved from the Internet: <http://www.appsense.com/products/desktop/desktopnow/>, Retrieved on May 13, 2013, 2 pages.

"Encrypting File System," Retrieved from the Internet: <http://en.wikipedia.org/wiki/Encrypting_File_System>, 8 pages.

Apple, Inc., "iOS App Programming Guide," Apr. 23, 2013, Retrieved from the Internet: <http://developer.apple.com/library/ios/#DOCUMENTATION/iPhone/Conceptual/i-PhoneOsProgramming-Guide/AdvancedAppTricks/AdvancedAppTricks.html#//apple_ref/doc/uid/TP40007072-CH7-SW11>, 149 pages.

"Fingerprint (computing)," Retrieved from the Internet: <http://en.wikipedia.org/wiki/Fingerprint_%28computing%29>, 4 pages.

"Citrix ShareFile," Retrieved from the Internet: <http://www.sharefile.com/>, Retrieved on Jul. 24, 2013, 2 pages.

"OpenText Managed File Transfer," 2011, Retrieved from the Internet: <http://connectivity.opentext.com/resource-centre/evaluations/opentext-man-aged-file-transfer.aspx>, 1 page.

Office Action for U.S. Appl. No. 13/892,678, dated May 9, 2018, 32 pages.

* cited by examiner

CONTEXT AWARE BROWSER POLICY

CROSS REFERENCE TO RELATED APPLICATION

This application is a continuation of U.S. patent application Ser. No. 14/243,040, filed Apr. 2, 2014, titled "Context Aware Browser Policy," which is a continuation-in-part of U.S. patent application Ser. No. 13/892,678, filed May 13, 2013, titled "Web Event Framework," the disclosures of both of which are incorporated by reference in their entirety.

TECHNICAL FIELD

This application relates generally to centralized software environment management, and more specifically to a framework for network-based remote management of client systems.

BACKGROUND

Computer systems can provide user environment management and/or policy control for computing devices (e.g., Windows based PCs). A system policy can be defined within an enterprise computer network either: to respond to system events such as computer startup/shutdown, user login/logoff, process start/stop, and session changes, etc.; or to prevent or control user behavior in applications and the desktop environment. For example, a pre-defined script can run when a user logs in to a corporate network; a particular group of users can be prevented from using parts of an application. The conventional user environment and/or policy control mechanisms, however, are limited to handle application and system level events and policies, not events and policies related to web browsers. Some examples of web events include webpage loading, URL clicking, adding/deleting a tab within a web browser, etc. Typical policies include, for example, blocking of URLs and redirection and preventing use of particular buttons or menus inside an web page.

SUMMARY

In accordance with the disclosed subject matter, systems and methods are described for a web event framework.

Disclosed subject matter includes, in one aspect, a computerized method, which includes receiving at a framework plugin an event from a web browser, wherein the framework plugin is coupled to the web browser, generating, by the framework plugin, a framework event based on the event, forwarding the framework event to a framework server coupled to the framework plugin, receiving at the framework server the framework event from the framework plugin, determining, at the framework server, a framework action based on the framework event and a framework policy, forwarding the framework action to the framework plugin, and executing the framework action by the framework plugin, wherein executing the framework action includes modifying one or more settings for the web browser, wherein the modified settings are based on the framework policy and sending an instruction to the web browser to cause the web browser to reload at least one web page under the modified settings.

In some embodiments, the computerized method also includes recording the unmodified settings for the web browser prior to modifying the settings; and resetting the settings for the web browser to the recorded, unmodified settings after modifying the settings and sending the instruction to reload at least one web page under the modified settings.

In some other embodiments, the computerized method also includes receiving the framework policy from a policy store.

In some other embodiments, the computerized method also includes customizing the framework server based on the framework policy.

In some other embodiments, the computerized method also includes receiving at the framework server an external event from an external event source, and determining, at the framework server, the framework action based on the external event and the framework policy.

In some other embodiments, the computerized method also includes initiating an external process based on the framework action.

In some other embodiments, the computerized method also includes forwarding the framework action to a second framework plugin coupled to a second web browser.

In some other embodiments, the computerized method also includes executing the framework action by the second framework plugin.

In some other embodiments, the computerized method also includes forwarding the framework action over a network to a second framework server.

In some other embodiments, the computerized method also includes processing the framework action by the second framework server.

In some other embodiments, the computerized method also includes forwarding the framework event over a network to a second framework server.

In some other embodiments, the computerized method also includes determining at the second framework server a second framework action based on the framework event and a second framework policy.

Disclosed subject matter includes, in another aspect, a computer system for a web event framework, which includes a processor configured as a framework plugin coupled to a web browser, including: a browser interface configured to communicate with the web browser, a web event monitor configured to monitor an event generated by the web browser, a framework event generator configured to generate a framework event based on the event, and a framework server interface configured to send the framework event to a framework server, and the processor further configured as a framework server communicating with the framework plugin, including: a framework plugin interface configured to receive the framework event from the framework plugin, a framework action determiner configured to determine a framework action based on the received framework event and a framework policy, the framework action including instructions to modify at least one setting of the web browser, wherein the framework plugin interface is further configured to send the framework action to the framework plugin, wherein the framework server interface is further configured to receive the framework action from the framework server and the framework plugin further comprises a framework action executor configured to execute the received framework action received, including modifying the one or more browser settings and sending an instruction to the web browser to cause the web browser to reload at least one web page under the modified settings.

In some embodiments, the framework server further includes a policy store interface configured to receive the framework policy from a policy store.

In some other embodiments, the framework server further includes a framework policy configurator configured to customize the framework server based on the framework policy.

In some other embodiments, the framework plugin further includes a webpage updater configured to generate or modify a webpage.

In some other embodiments, the framework server further includes an external event interface configured to receive an external event from an external event source and the framework action determiner is further configured to determine the framework action based on the external event and the framework policy.

In some other embodiments, the framework server further includes an external process interface configured to initiate an external process based on the framework action.

In some other embodiments, the framework plugin interface is further configured to communicate with a second framework plugin coupled with a second web browser.

Disclosed subject matter includes, in yet another aspect, a non-transitory computer readable medium having executable instructions operable to, when executed by a processor, cause the processor to: receive at a framework plugin a web event from a web browser, wherein the framework plugin is coupled with the web browser, generate by the framework plugin a framework event based on the web event, forward the framework event to a framework server coupled to the framework plugin, receive at the framework server the framework event from the framework plugin, determine at the framework server a framework action based on the framework event and a framework policy, forward the framework action to the framework plugin, and execute the framework action by the framework plugin, wherein executing the framework action includes modifying one or more settings for the web browser, wherein the modified settings are based on the framework policy, and sending an instruction to the web browser to cause the web browser to reload at least one web page under the modified settings.

Various embodiments of the subject matter disclosed herein can provide one or more of the following capabilities. Systems and methods for a web event framework can reduce system complexity. Framework servers and framework plugins can be designed without complex business logic. For example, a framework server can act as a simple event sink while a framework plugin can act as an event producer. A framework server can receive framework events from all event sources and determine framework actions based on a framework policy. Systems and methods for a web event framework can also improve flexibility and maintainability. Changing a framework policy itself can change the behaviors of a web event framework. There is no need to modify the framework server and/or the framework plugin. Systems and methods for a web event framework can also increase extendibility. Adding framework events to a framework policy can expand the list of events handled by a web event framework without updating the framework server and/or the framework plugin.

These and other capabilities of embodiments of the disclosed subject matter will be more fully understood after a review of the following figures, detailed description, and claims.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

DESCRIPTION

Figure 1:
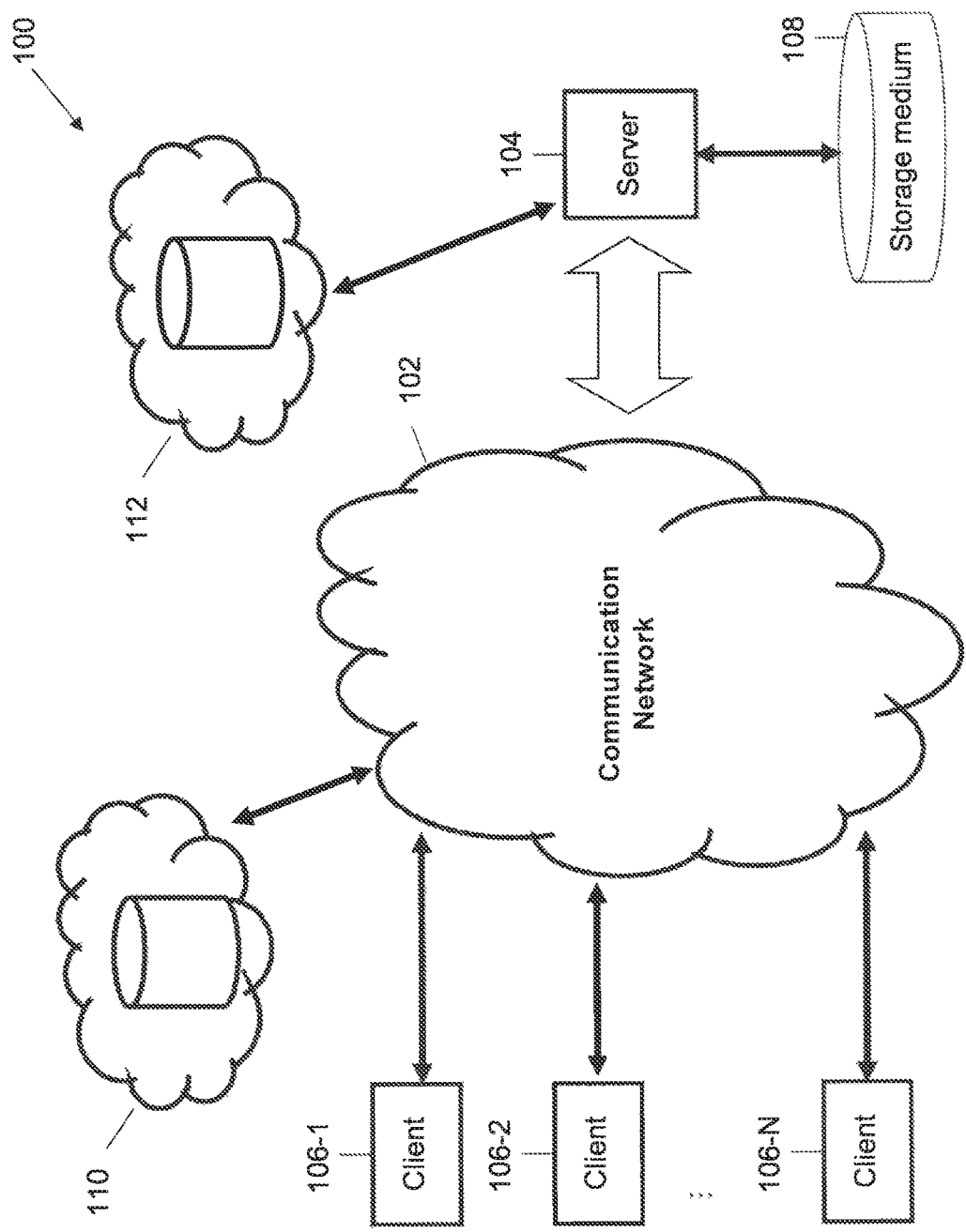
FIG. 1 illustrates an exemplary networked computing environment in accordance with some embodiments.

In the following description, numerous specific details are set forth regarding the systems and methods of the disclosed subject matter and the environment in which such systems and methods may operate, in order to provide a thorough understanding of the disclosed subject matter. It will be apparent to one skilled in the art, however, that the disclosed subject matter may be practiced without such specific details, and that certain features, which are well known in the art, are not described in detail in order to avoid complication of the disclosed subject matter. In addition, it will be understood that the embodiments described below are only examples, and that it is contemplated that there are other systems and methods that are within the scope of the disclosed subject matter.

Mechanisms, such as browser extensions, can potentially modify a user's browser experience. The logic and control of these mechanisms are typically self-contained in the web browser, making these mechanism more complex, less flexible and robust, and more difficult to maintain and extend. Embodiments of the disclosed subject matter can provide features for a web event framework, which can reduce system complexity, improve flexibility and robustness, and increase maintainability and extendibility.

In one exemplary implementation, a web event framework can include a framework plugin, a framework server, and a framework policy store. The framework plugin can be embedded inside a web browser. The framework server can be independent and outside the realm of web browsers and can receive framework events from one or more framework plugins or other external event sources. The framework server can determine a framework action based on the framework event and a framework policy stored in a policy store, and then forward the framework action back to the framework plugin embedded within the web browser or execute the framework action, for example, if it's a system command. The framework policy can be updated to customize the web event framework. The framework plugin can process web pages based on the framework actions received from the framework server. Some exemplary user scenarios include: a certain event is triggered when a particular URL is hit; certain web pages or applications are locked or disabled based on a corporate policy; certain browser settings and security policies are customized based on a user's location, IP address, or credentials, etc.; and web browsers respond to remote connection session changes.

In one exemplary use scenario, a framework server can generate a framework action to automatically launch a frequently-used work-related website in a user's web browser when it is 9 AM on weekdays or to block certain company secure websites when it is 5 PM or during weekends. In another exemplary use scenario, when a framework server receives an external event indicating a laptop computer has left the corporate building, the framework server can generate a framework action closing all browser windows/tabs loaded with corporate confidential information.

Embodiments of the disclosed subject matter can be implemented in a networked computing environment. FIG. 1 illustrates an exemplary networked computing environment 100 in accordance with certain embodiments of the disclosed subject matter. The networked computing environment 100 can include a server 104, at least one client 106 (e.g., client 106-1, 106-2, . . . 106-N), a physical storage medium 108, and cloud storage 110 and 112, which can all be coupled, directly or indirectly to a communication network 102.

Each client 106 can communicate with the server 104 to send data to, and receive data from, the server 104 across the communication network 102. Each client 106 can be directly coupled to the server 104. Additionally, each client 106 can be connected to server 104 via any other suitable device, communication network, or combination thereof. For example, each client 106 can be coupled to the server 104 via one or more routers, switches, access points, and/or communication network (as described below in connection with communication network 102). A client 106 can include, for example, a desktop computer, a mobile computer, a tablet computer, a cellular device, a smartphone, or any computing systems that are capable of performing computation.

Server 104 can be coupled to at least one physical storage medium 108, which can be configured to store data for the server 104. Preferably, any client 106 can store data in, and access data from, the physical storage medium 108 via the server 104. FIG. 1 shows the server 104 and the physical storage medium 108 as separate components; however, the server 104 and physical storage medium 108 can be combined together. FIG. 1 also shows the server 104 as a single server; however, server 104 can include more than one server. FIG. 1 shows the physical storage medium 108 as a single physical storage medium; however, physical storage medium 108 can include more than one physical storage medium. The physical storage medium 108 can be located in the same physical location as the server 104, at a remote location, or any other suitable location or combination of locations.

FIG. 1 shows two embodiments of a cloud storage 110 and 112. Cloud storage 110 and/or 112 can store data from physical storage medium 108 with the same restrictions, security measures, authentication measures, policies, and other features associated with the physical storage medium 108. While FIG. 1 shows the cloud storage 112 separate from the communication network 102, cloud storage 112 can also be part of communication network 102 or another communication network. The server 104 can use only cloud storage 110, only cloud storage 112, or both cloud storages 110 and 112. While, FIG. 1 shows one cloud storage 110 and one cloud storage 112, more than one cloud storage 110 and/or more than one cloud storage 112 or any suitable combination thereof can be used.

The communication network 102 can include the Internet, a cellular network, a telephone network, a computer network, a packet switching network, a line switching network, a local area network (LAN), a wide area network (WAN), a global area network, or any number of private networks currently referred to as an Intranet, and/or any other network or combination of networks that can accommodate data communication. Such networks may be implemented with any number of hardware and software components, transmission media and network protocols. While FIG. 1 shows the network 102 as a single network, the network 102 can also include multiple interconnected networks listed above.

Figure 2:
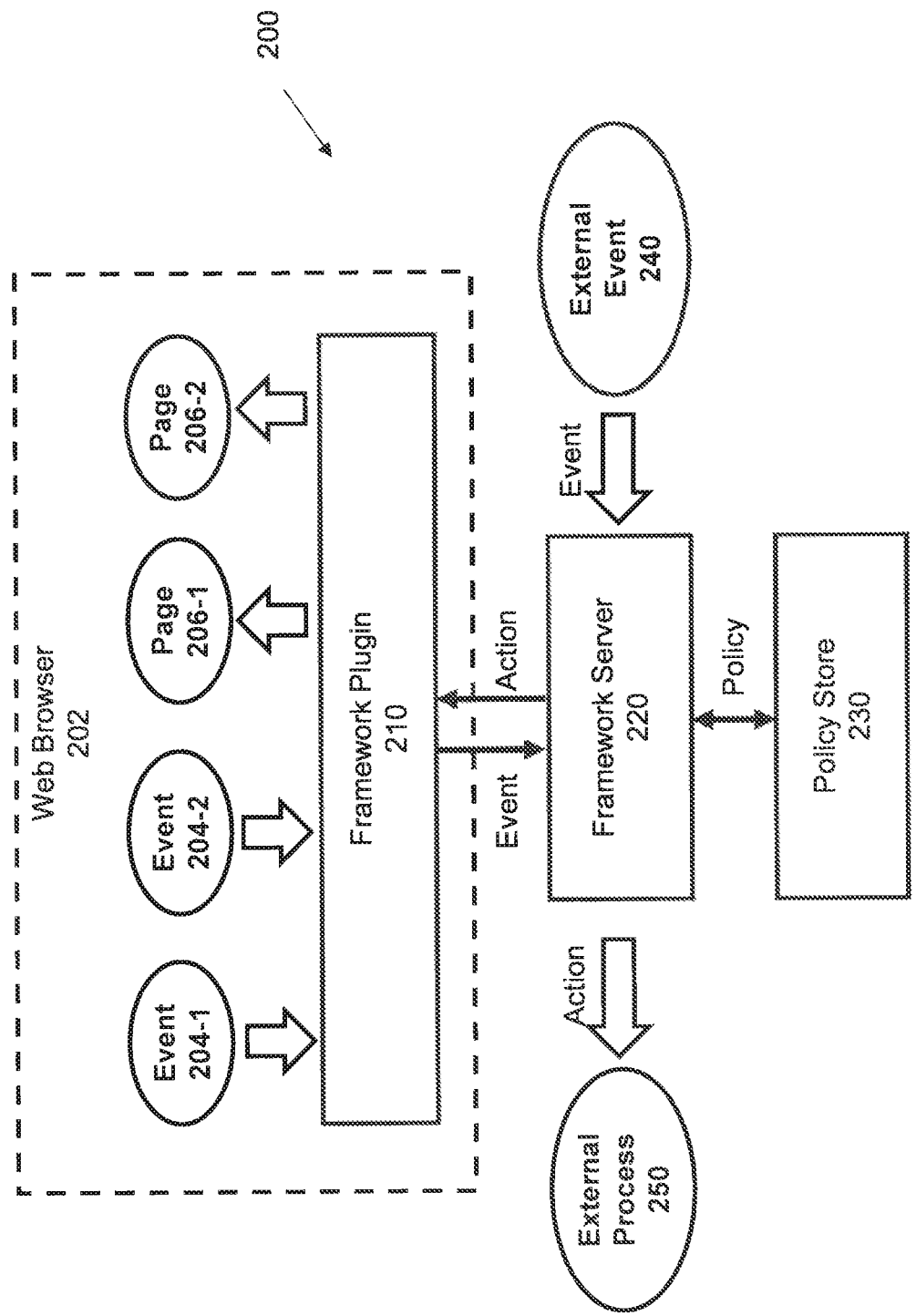
FIG. 2 illustrates an exemplary web event framework arrangement in accordance with some embodiments.

FIG. 2 illustrates an exemplary web event framework arrangement 200 according to certain embodiments of the disclosed subject matter. The web event framework arrangement 200 can include a framework plugin 210, a framework server 220, and a policy store 230.

Referring to FIG. 2, the framework plugin 210 can be associated with a web browser 202. A web browser 202 can be associated with one or more of the framework plugins 210. When multiple plugins are associated with one web browser, functionalities can be split among the multiple plugins. In one example, the framework plugin 210 can be embedded within the web browser 202; in another example, only a portion of the framework plugin 210 is embedded within web browser 202 and the rest can be outside but coupled to the web browser 202. The framework plugin 210 can receive events (e.g., 204-1 and 204-2, etc.) from the web browser 202. One type of such received events are web events generated by the web browser 202, such as navigating to a webpage. The framework plugin 210 can also perform actions in connection with the web browser 202, such as generating or modifying pages (e.g., 206-1 and 206-2, etc.). More examples of actions that can be performed by the framework plugin 210 are discussed later.

The framework server 220 can communicate with the framework plugin 210. The framework server 220 can receive an event (e.g., a framework event) from the framework plugin 210, determine an action (e.g., a framework action) based on the framework event, and forward the action to the framework plugin 210. In some embodiments, the framework server 220 can be outside and not associated with the web browser 202. In one example, the framework server 220 can reside locally on the same computing device as the framework plugin 210; in another example, the framework server 220 can reside remotely on a different computing device.

In addition, the framework server 220 can receive events (e.g., external event 240) from an external event source and can also perform external actions (e.g., initiating an external process 250). An external event source can either be local at the same computing device or be remote at a different computing device. An external action can be performed either locally at the same computing device or remotely at a different computing device. Additional details about external events and external actions are discussed later in this document.

In some embodiments, a framework server 220 can run a communication server (e.g., a socket server) listening for connections from one or more framework plugins 210. In some other embodiments, a framework server 220 can also run a communication server (e.g., a HTTP server) listening for messages (e.g., HTTP POST messages) from external event sources or other framework servers. A framework server 220 in a web event framework can be different from a traditional web server or proxy. According to embodiments of the disclosed subject matter, web pages can still be served by traditional web servers and a framework server 220 does not need to serve or download web pages directly.

In some embodiments, a framework plugin 210 can connect to a framework server 220 when it is first loaded (e.g., when its associated web browser 202 starts). Alternatively, a framework plugin 210 can connect to a framework server 220 at a later time. In some embodiments, a framework server 220 can halt or suspend web browser activities if a framework plugin is not detected. For example, AppSense's Application Manager product can be utilized to detect process launches and control the execution and/or internet access of the launched process.

The framework server 220 can also receive a policy (e.g., a framework policy) from a policy store 230. A framework policy can define how the framework server 220 determine a framework action based on a framework event. In one example, the policy store 230 can reside locally on the same computing device as the framework server 220; in another example the policy store 230 can reside remotely on a different computing device. In some embodiments, the policy store 230 can contain one configuration file per end user. In other embodiments, for example for a large enterprise, the policy store 230 can contain a generic configuration file suitable for a plurality of users. The generic configuration file can be customized and delivered, via the policy store, to each unique end user. In some other embodiments, there can be a global universal configuration file.

Figure 3:
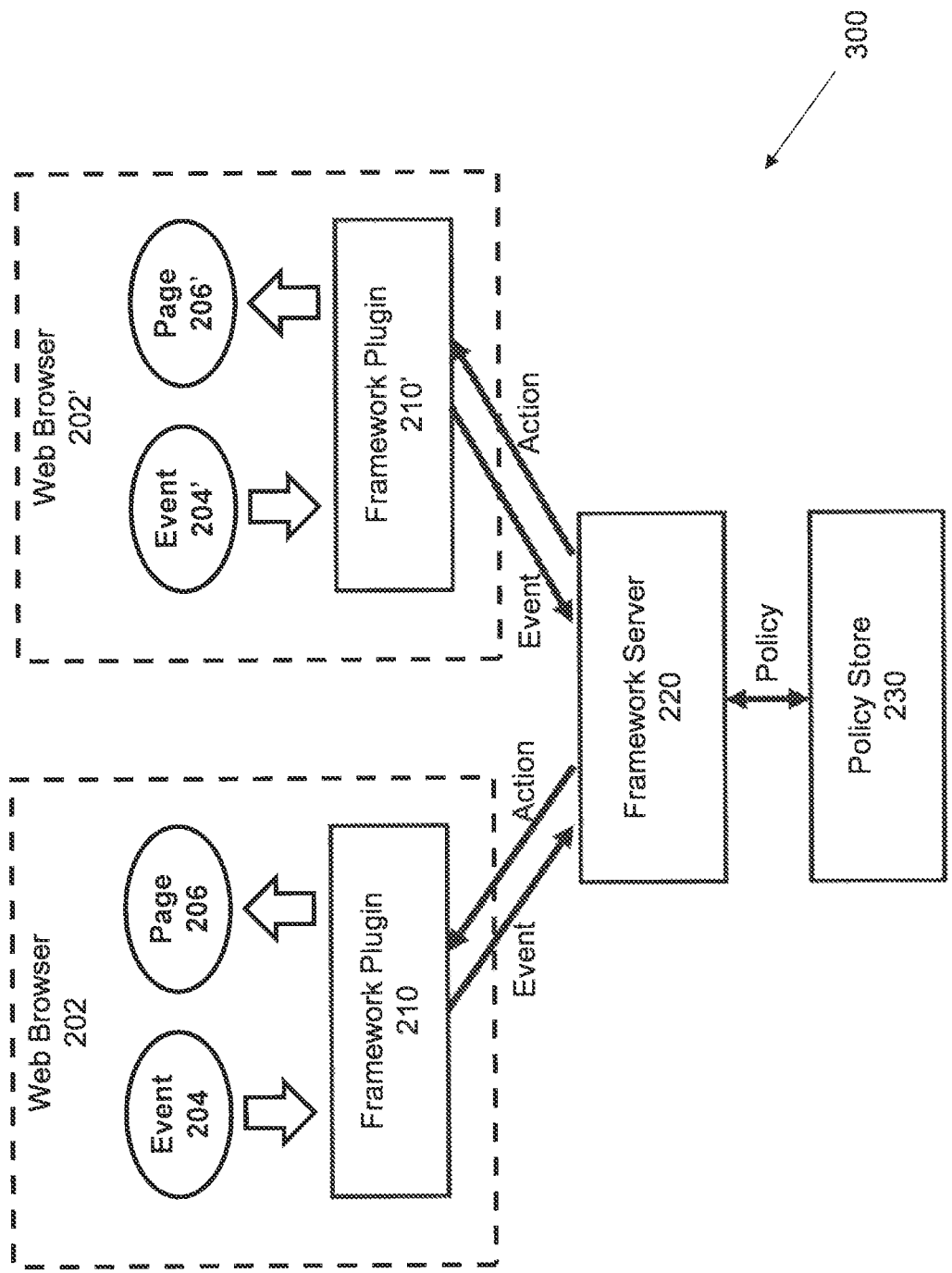
FIG. 3 illustrates another exemplary web event framework arrangement in accordance with some embodiments.

FIG. 3 illustrates another exemplary web event framework arrangement 300 according to certain embodiments of the disclosed subject matter. The web event framework arrangement 300 can include multiple framework plugins 210 and 210', a framework server 220, and a policy store 230. In this embodiment, the framework server 220 can operate in a manner similar to that described above with respect to FIG. 2, while being connected to multiple framework plugins.

Referring to FIG. 3, the framework plugin 210 can be associated with a web browser 202 while the framework plugin 210' can be associated with a web browser 202'. The web browsers 202 and 202' can be different types of web browsers. For example, the web browser 202 can be an Internet Explorer (IE) from Microsoft while the web browser 202' can be a Chrome browser from Google. The web browsers 202 and 202' can also be different sessions of a same type of web browsers. For example, the web browser 202 can be one IE browser session while the web browser 202' can be a different IE browser session. The framework plugin 210 can receive events (e.g., 204) from the web browser 202 while the framework plugin 210' can receive events (e.g., 204') from the web browser 202'. The framework plugin 210 can also perform actions (e.g., modifying a page 206) in the web browser 202 while the framework plugin 210' can also perform actions (e.g., modifying a page 206') in the web browser 202'.

The framework server 220 can communicate with both framework plugins 210 and 210'. The framework server 220 can receive an event (e.g., a framework event) from the framework plugin 210, determine an action (e.g., a framework action) based on the framework event, and forward the action to the other framework plugin 210' associated with the other web browser 202'. In this manner, an event at one web browser can cause an action at another web browser. In some embodiments, the framework server 220 can be outside and not associated with either web browser 202 or 202'. In one example, the framework server 220 can reside locally on the same computing device as the framework plugin 210 or 210'; in another example the framework server 220 can reside remotely on a different computing device. The framework server 220 can also receive a policy (e.g., a framework policy) from a policy store 230. A framework policy can define how the framework server 220 determine a framework action based on a framework event. In one example, the policy store 230 can reside locally on the same computing device as the framework server 220; in another example the policy store 230 can reside remotely on a different computing device.

In some embodiments, security considerations in some web browsers may prevent the framework server 220 from initiating an inbound connection into a framework plugin (e.g., 210'). In these situations, the framework plugin (e.g., 210') can initiate an outbound connection out to the framework server 220. Once a connection has been made, data traffic can flow freely in both directions. In other embodiments, additional security measures, for example in Internet Explorer 10 on Windows 8, may allow a connectivity to the framework server 220 only if the framework server 220 has a known DNS name (e.g., localhost). In these situations, a framework server on a remote machine may need to have a valid DNS entry to be accessible.

In addition, like illustrated in FIG. 2, the framework server 220 in FIG. 3 can also receive events from an external event source and perform external actions (e.g., initiating an external process). In one exemplary scenario, clicking on "I'm feeling lucky" at Google.com in an IE browser can open a tab with the search results in a Safari browser.

Figure 4:
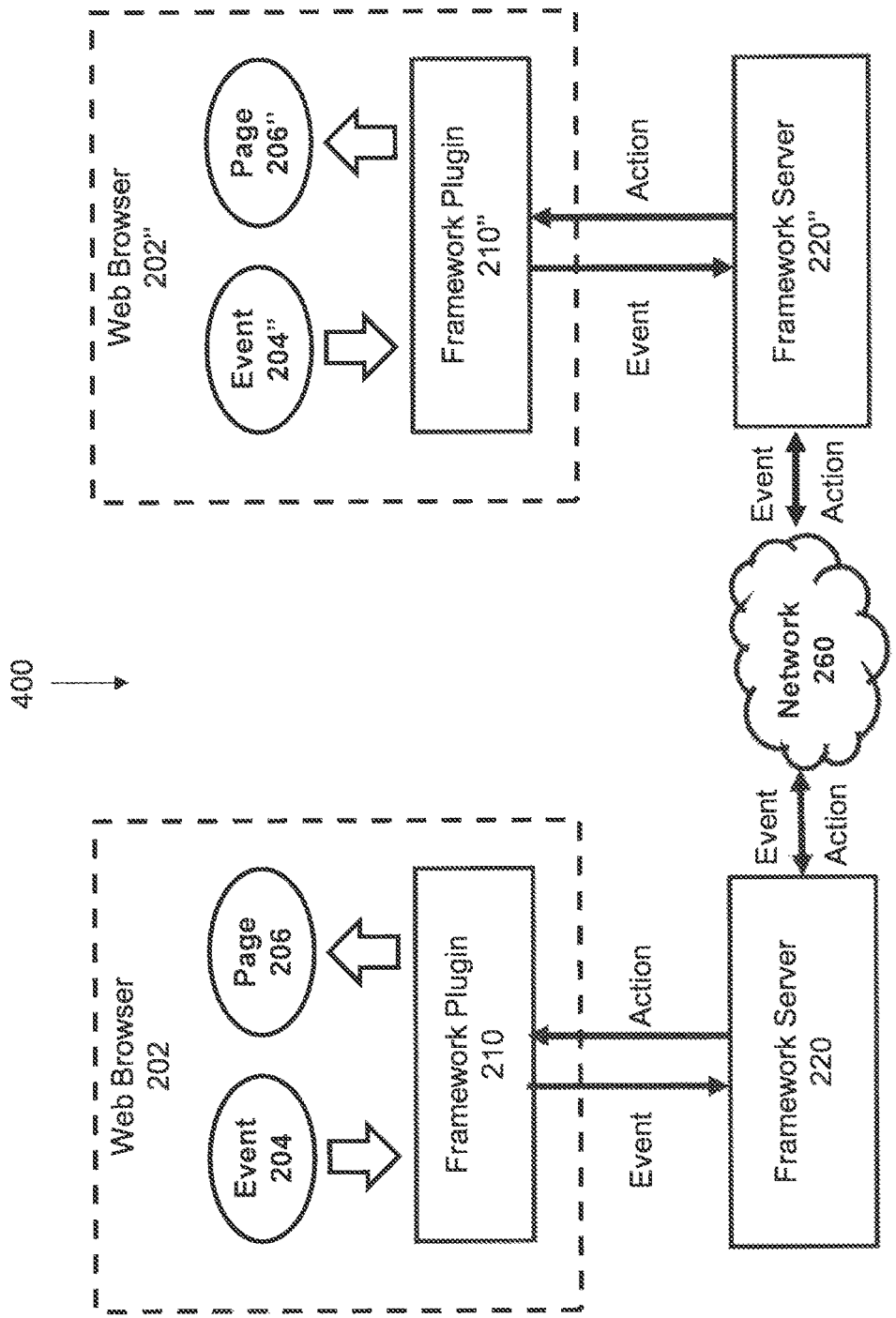
FIG. 4 illustrates yet another exemplary web event framework arrangement in accordance with some embodiments.

FIG. 4 illustrates yet another exemplary web event framework arrangement 400 according to certain embodiments of the disclosed subject matter. The web event framework arrangement 400 can include multiple framework plugins 210 and 210', multiple framework servers 220 and 220', and a network 260.

Referring to FIG. 4, the framework plugin 210 can be associated with a web browser 202 while the framework plugin 210" can be associated with a web browser 202". The web browsers 202 and 202" can be the same or different types of web browsers. In one example, the web browsers 202 and 202" can both be an IE browser on different computing devices. In another example, the web browsers 202 can be an IE on one computer device (e.g., a Windows PC) while the web browser 202" can be a Chrome browser from Google on a different computing device (e.g., a Mac computer from Apple). The framework plugin 210 can receive events (e.g., 204) from the web browser 202 while the framework plugin 210" can receive events (e.g., 204") from the web browser 202". The framework plugin 210 can also perform actions (e.g., modifying a page 206) in the web browser 202 while the framework plugin 210" can also perform actions (e.g., modifying a page 206") in the web browser 202". The framework plugin 210 and the web browser 202 can reside on a different computing device from the framework plugin 210" and the web browser 202".

The framework server 220 can communicate with the framework plugins 210. The framework server 220" can communicate with the framework plugins 210". The framework server 220 can communicate with the framework server 220" over a network 260. In some embodiments, a framework server 220/220" can run a communication server (e.g., a HTTP server) listening for framework events/actions (e.g., via HTTP POST messages) from other framework servers. A HTTP server can be chosen, for example, because of its compatibility with firewalls. The framework plugins 202 and 202" can communicate with each other via the framework servers 220 and 220". In some embodiments, the framework server 220 can receive a framework event from the framework plugin 210, determine a framework action based on the framework event, and forward the framework action over the network 260 to the other framework server 220", which can in turn forward the received framework action to the other framework plugin 210" associated with the other web browser 202". In some other embodiments, the framework server 220 can receive a framework event from the framework plugin 210 and forward the framework event over the network 260 to the other framework server 220", which can in turn determine a framework action based on the framework event and then forward the determined framework action to the other framework plugin 210" associated with the other web browser 202". In some embodiments, the framework servers 220 and 220" can each have its own policy store or framework policy. In some other embodiments, the framework servers 220 and 220" can share one common policy store or framework policy, which can reside locally with either framework server 220/220' or be accessed remotely via the network 260.

In addition, like illustrated in FIG. 2, the framework servers 220 and 220" in FIG. 4 can also receive events from an external event source and perform external actions (e.g., initiating an external process). In one exemplary scenario, clicking on "I'm feeling lucky" at Google.com in an IE browser on a PC can open a tab with the search results in a Safari browser on a Mac.

Figure 5:
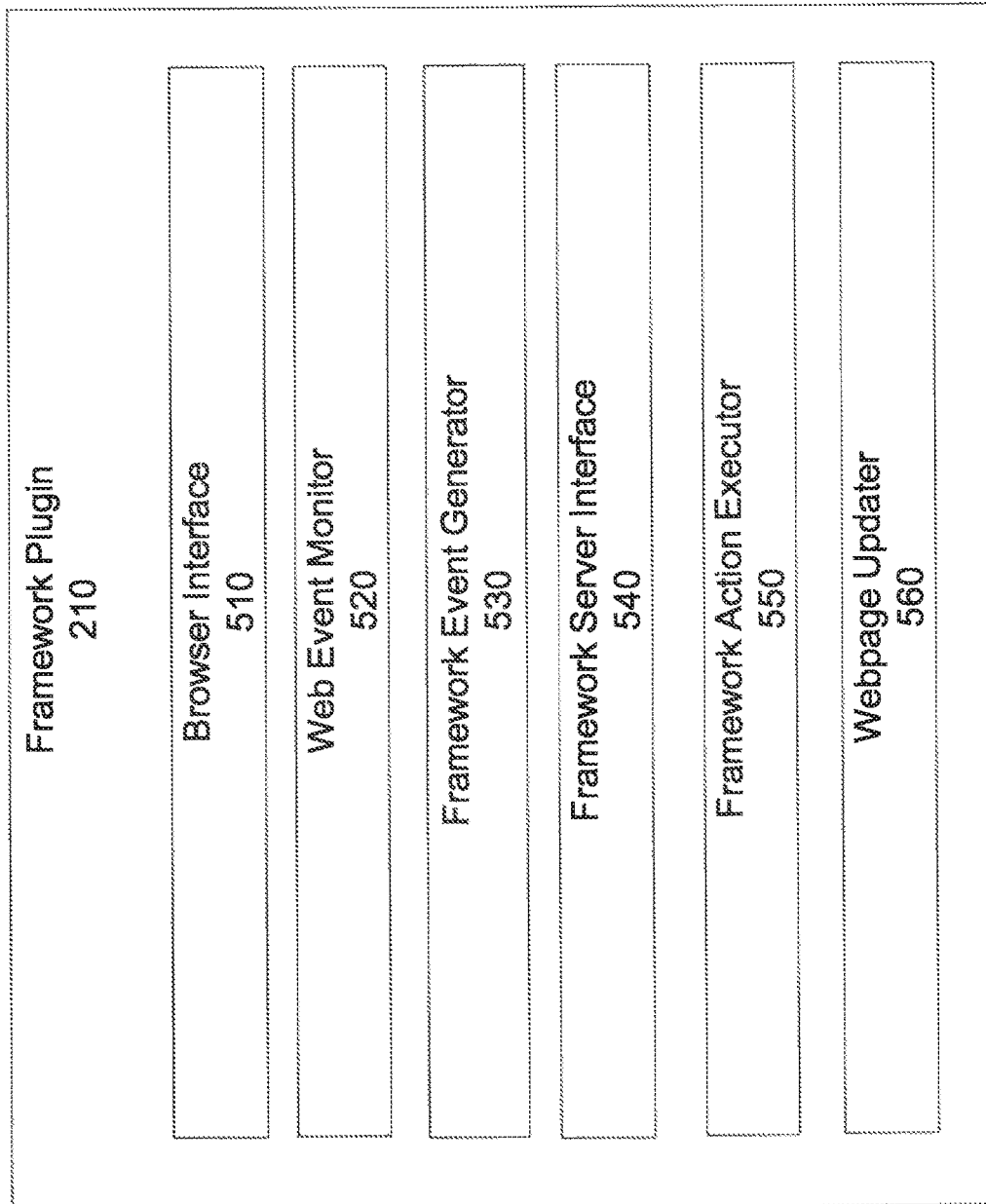
FIG. 5 illustrates a block diagram of an exemplary web event framework plugin in accordance with some embodiments.

FIG. 5 illustrates a block diagram of an exemplary web event framework plugin 210 according to certain embodiments of the disclosed subject matter. The framework plugin 210 can include a browser interface 510, a web event monitor 520, a framework event generator 530, a framework server interface 540, a framework action executor 550, and a webpage updater 560. The framework plugin 210 can include additional modules, fewer modules, or any other suitable combination of modules that perform any suitable operation or combination of operations.

The browser interface 510 can allow the framework plugin 210 to communicate with a web browser (e.g. 202). In one example, the browser plugin 210 can receive events (e.g., web browsing events) generated by the web browser through the browser interface 510. In another example, the browser plugin 210 can send actions (e.g., closing a browser window) or action results (e.g., a modified webpage) to the web browser through the browser interface 510.

The web event monitor 520 can monitor the events received, e.g., via the browser interface 510, from a web browser (e.g., 202). Examples of web events monitored by the web event monitor 520 can include:
  "Before Navigate"
  "Tab Changed"
  "Page Loaded"
  "Body Clicked"
The "Before Navigate" web event can occur when a web browser is just about to navigate to a new webpage. The "Tab Changed" web event can occur when a web browser changes to a new tab. For example, when a Google search result is clicked on, a "Tab Changed" web event is generated. The "Page Loaded" web event can occur when a document (e.g., a webpage) has been loaded into a tab. The "Body Clicked" web event can occur when an element (e.g., a button or a link) on a webpage is clicked. The list of web events being monitored by the framework plugin 210 can be updated and customized to fit individual needs. In some embodiments, the list of web events being monitored by the framework plugin 210 can be defined in an external file, such as a framework policy stored in a policy store (e.g., 230). If the web event monitor 520 detects an event it does not recognize, it can be configured to ignore this event. Optionally, an alert (e.g., an error message) can be generated and presented to the user or administrator.

The framework event generator 530 can generate a framework event based on a web event, e.g., detected by the web event monitor 520. Examples of framework events generated by the framework event generator 530 can include:
  "navigate"
  "pageLoaded"
  "bodyClick"
A "navigate" framework event can be generated when a "Before Navigate" or "Tab Changed" web event is detected (e.g., when a web browser is just about to navigate to a new webpage or change to a new tab). A "pageLoaded" framework event can be generated when a "Page Loaded" web event is detected (e.g., when a webpage has been loaded into a tab). A "bodyClick" framework event can be generated when a "Body Clicked" web event is detected (e.g., when a hyperlink on a webpage is clicked). In some embodiments, a framework event can be associated with one or more parameters which can be either required or optional. Examples of parameters associated with framework events can include:
  "source"—the URL of the webpage where the framework event originates
  "tabID"—the ID of the tab where the framework event originates
  "text"—the inner text of a clicked element on a webpage
  "href"—the href of a clicked element on a webpage
  "value"—the value of a clicked element on a webpage
  "id"—the ID of a clicked element on a webpage
  "name"—the name of a clicked element on a webpage
  "type"—the type of a clicked element (e.g., a button or a link, etc.) on a webpage
In some embodiments, the "source" and "tabID" parameters can be required for all framework events; the "type" parameter can be required for some framework events (e.g., "bodyClick" framework events). The list of framework events generated by the framework plugin 210, how they are generated, and how they correspond to certain web events can be updated and customized to fit individual needs. In some embodiments, the list of framework events, how they are generated, and how they correspond to certain web events can be defined in an external file, such as a framework policy stored in a policy store (e.g., 230). If the framework event generator 530 does not know how to handle a detected web event, it can be configured to ignore this web event. Optionally, an alert (e.g., an error message) can be generated and presented to the user or administrator.

The framework server interface 540 can allow the framework plugin 210 to communicate with a framework server (e.g. 220). In one example, the browser plugin 210 can forward a framework event generated by the framework event generator 530 to a framework server through the framework server interface 540. In another example, the browser plugin 210 can receive a framework action from a framework server through the framework server interface 540. In one example, the framework server interface 540 can be implemented using JavaScript and the socket.io library. A listener can be set up in the framework server. The framework plugins can connect to the listener and then maintain a permanent connection between the server and plugins. Communication can then be bi-directional using packets constructed from, e.g., JavaScript Object Notation (JSON) key/value pairs.

The framework action executor 550 can execute a framework action, e.g., received from a framework server. More details about the framework action executor 550 executing framework actions will be discussed later in this document.

The webpage updater 560 can generate or update a webpage based on the framework action received from a framework server. In some embodiments, the webpage updater 560 can work with the framework action executor 550 to generate or update a webpage. More details about the webpage updater 560 generating/updating webpages will be discussed later in this document.

Figure 6:
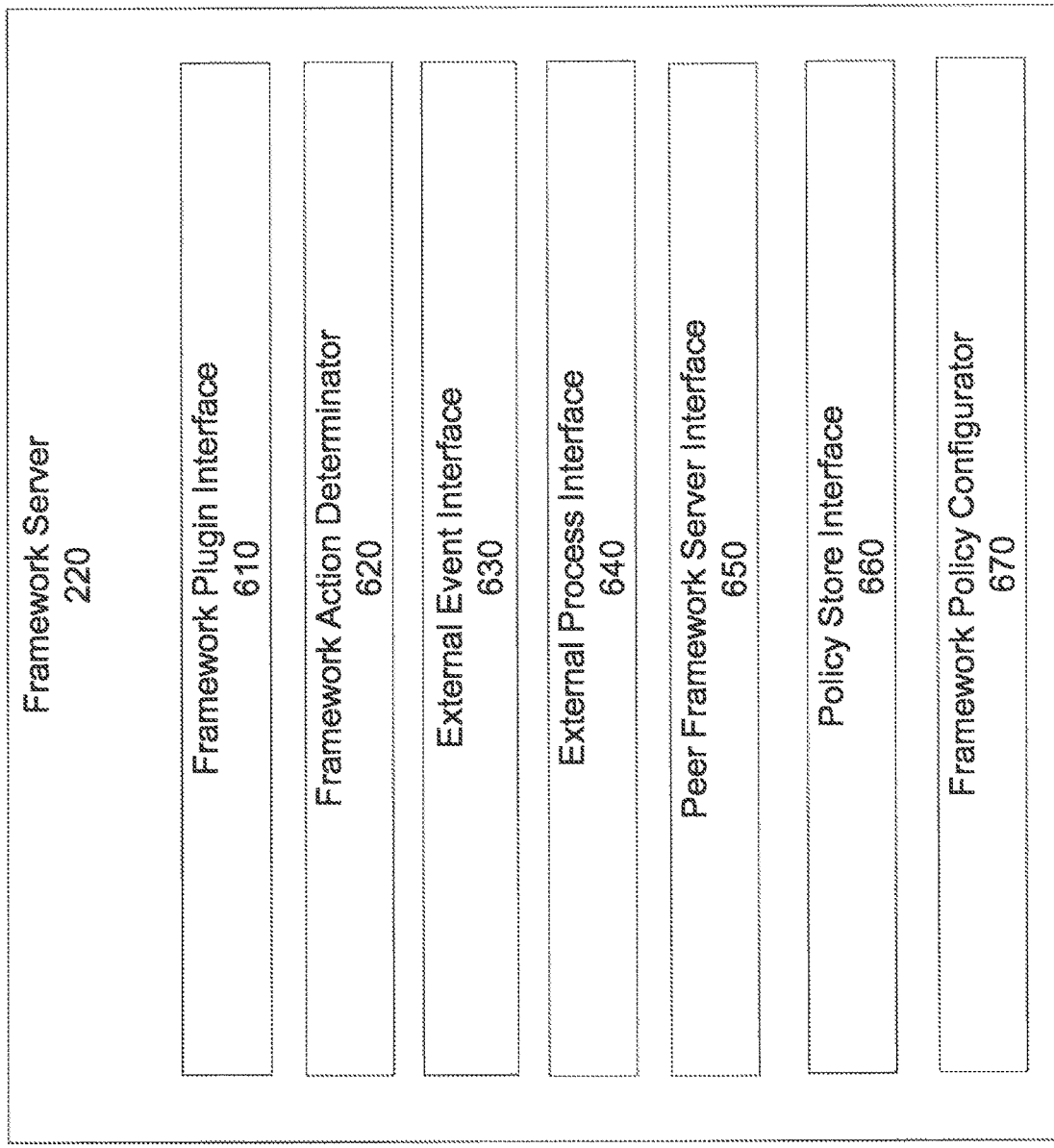
FIG. 6 illustrates a block diagram of an exemplary web event framework server in accordance with some embodiments.

FIG. 6 illustrates a block diagram of an exemplary web event framework server 220 according to certain embodiments of the disclosed subject matter. The framework server 220 can include a framework plugin interface 610, a framework action determiner 620, an external event interface 630, an external process interface 640, a peer framework server interface 650, a policy store interface 660, and a framework policy configurator 670. The framework server 220 can include additional modules, fewer modules, or any other suitable combination of modules that perform any suitable operation or combination of operations.

The framework plugin interface 610 can allow the framework server 220 to communicate with a framework plugin (e.g. 210). In one example, the framework server 220 can receive a framework event generated at a framework plugin through the framework plugin interface 610. In another example, the framework serve 220 can forward a framework action to a framework plugin through the framework plugin interface 610. In some embodiments, the framework server 220 can communicate with multiple framework plugins through a common framework plugin interface 610. In some other embodiments, the framework server 220 can communicate with multiple framework plugins through different framework plugin interfaces 610, each of which corresponds to one of the multiple framework plugins 210.

The framework action determiner 620 can determine a framework action. In some embodiments, the framework action can be determined based on a framework event, e.g., received at the framework plugin interface 610. Examples of framework actions can include:

"navigate"
"relink"
"disableElement"
"closeTab"
"externalProcess"
"settings"

A framework action can be associated with one or more arguments which can be either required or optional. For example, a "navigate" framework action can cause a web browser to navigate to a target URL and can thus have an argument specifying this target URL; a "navigate" framework event can also have an argument defining whether the webpage specified by the target URL should be opened in a new or existing page/tab. A "relink" framework action can cause a web browser to change all hyperlinks on a webpage that match a given pattern to a target URL or certain JavaScript function and can thus have an argument specifying this given pattern and target URL or JavaScript function. A "disableElement" framework action can cause a web browser to disable a certain element on a webpage based on the web element's ID, name, text, or css selector and can thus have an argument identifying this element on the webpage. A "closeTab" framework action can cause a web browser to close the current tab, a specific tab, or a range of tabs and can thus have an argument identifying the tab(s) to be closed. An "externalProcess" framework action can initiate an external process or application and can thus have an argument defining the launching options for the external application. Alternatively, an "externalProcess" framework action may control an existing program by, for example, providing a script for automatically submitting inputs to the program by means of the program's user interface, or submitting commands by means of a program API. A "settings" framework action can modify one or more of the web browser's settings and can thus have an argument specifying which settings to modify and what value to set each of the modified settings to. The "settings" framework action may then provide an instruction to the web browser to reload the current page under the newly modified settings. The web event framework may be further configured to remember the original settings and restore them after a browser window has closed or navigated away from a specific site.

In some embodiments, the argument(s) for a framework action can be fixed, pre configured based on the type of framework action, or generated dynamically based on the corresponding framework event and its parameters. For example, a target argument for a "navigate" framework action specifying the target URL can be derived from a domain parameter of a corresponding "navigate" framework event defining the URL a web browser is about to navigate to. In some other embodiments, more data can be collected from web events to provide more information for the corresponding framework action. For example, text entered into a web form on a webpage can be extracted and used to generate one or more arguments for a framework action.

The external event interface 630 can allow the framework server 220 to receive external events (e.g., 240) from an external event source. An external event source can either be local at the same computing device or be remote at a different computing device. In one example, the framework server 220 can receive a time event via the external event interface 630 from a system clock module indicating the time is 9 AM or 5 PM. In another example, the framework server 220 can receive a location event via the external event interface 630 from a system GPS module indicating a computing device (e.g., a laptop computer) has left or entered a corporate building. The framework action determiner 620 can determine a framework event based on the external event received from the external event source. In one example, the framework action determiner 620 can generate a framework action to automatically launch a frequently-used work-related website in a user's web browser when it is 9 AM on weekdays or to block certain company secure websites when it is 5 PM or during weekends. In another example, when the framework server 220 receives an external event indicating a laptop computer has left the corporate building, the framework server 220 can generate a framework action closing all browser windows/tabs loaded with corporate confidential information.

Examples of external event sources can include hardware modules (e.g., GPS device), software modules (e.g., AppSense Environment Manager or AppSense Application Manager), or combinations of both. In one example, an AppSense Environment Manager can generate an external event indicating a user login/logoff. In another example, an AppSense Application Manager can generate an external event indicating an application startup/shutdown. In some embodiments, an external event can originate from various remote technologies, such as Remote Desktop Protocol (RDP) from Microsoft or Independent Computing Architecture (ICA) from Citrix.

The external process interface 640 can allow the framework server 220 to initiate certain external processes (e.g., 250). An external process can be executed either locally at the same computing device or remotely at a different computing device. In one example, the framework server 220 can launch a Microsoft Word application via the external process interface 640. The external process being initiated can be based on a framework action generated by the framework action determiner 620. For example, when the framework server 220 receives a framework event indicating a stock-trading webpage has been loaded in a web browser, the framework server 220 can generate a framework action launching the Calculator application on the local computing device. In some embodiments, an external process can be initiated through various remote technologies, such as Remote Desktop Protocol (RDP) from Microsoft or Independent Computing Architecture (ICA) from Citrix.

The peer framework server interface 650 can allow the framework server 220 to communicate with other framework server (e.g., 220") over a network (e.g., 260). The framework server 220 can send/receive framework events or actions via the peer framework server interface 650 to/from another framework server (e.g., 220"). In some embodiments, a framework server (e.g., 220) can receive a framework event from an associated framework plugin (e.g., 210) and forward the framework event to the other framework server (e.g., 220"), which can in turn determine a framework action based on the received framework event and then forward the determined framework action to its associated framework plugin (e.g., 210"). In some other embodiments, the framework server (e.g., 220) can receive a framework event from an associated framework plugin (e.g., 210), determine a framework action based on the framework event, and forward the framework action to the other framework server (e.g., 220"), which can in turn forward the received framework action to its associated framework plugin (e.g., 210"). In one exemplary scenario, clicking on "I'm feeling lucky" at Google.com in an IE browser on a PC can open a tab with the search results in a Safari browser on a Mac.

Still referring to the framework server 220 in FIG. 6 and in particular to the framework action determiner 620, a framework action can also be determined based on a framework policy. In some embodiments, a framework policy can define whether and how to handle a particular framework event, and what, if any, framework action should be generated in response to a particular framework event with certain parameter(s). Some exemplary framework policies are described below. In these examples, the framework policies are presented and stored in JavaScript Object Notation (JSON) format. A framework policy file can contain one or more framework policies like the ones discussed below.

Framework Policy A:

```
"onNavigate":[
    {
        "action": "navigate",
        "domain": "www.bing.com",
        "target": "http://www.google.com"
    }
]
```

According to Framework Policy A, when a "navigate" framework event is received at the framework server with a domain parameter "www.bing.com," a "navigate" framework action is generated with a target argument "http://www.google.com." When this framework policy is implemented, a user trying to use the Bing search engine will be redirected to use the Google search engine. The framework server 220 can look up the domain names in a framework policy and identify one matching the domain parameter in an received framework event. The matching can be done by exact text matching or by some more robust matching mechanisms (e.g., regular expressions).

Framework Policy B:

```
"onPageLoaded":[
    {
        "action": "relink",
        "domain": "www.bbc.co.uk",
        "source": "http://www.bbc.co.uk/news/england/",
        "target": "http://www.bbc.co.uk/news/scotland/"
    },
    {
        "action": "disableElement",
        "domain": "eul.salesforce.com",
        "id": "phSearchButton"
    }
]
```

According to Framework Policy B, when a "pageLoaded" framework event is received at the framework server with a domain parameter "www.bbc.co.uk," a "relink" framework action is generated with a source argument "http://www.bbc.co.uk/news/england" and a target argument "http://www.bbc.co.uk/news/scotland." Upon implementing this framework policy, when a user visiting BBC's UK website, the links to England news will be changed to linking to Scotland news. Also according to Framework Policy B, when a "pageLoaded" framework event is received at the framework server with a domain parameter "eul.salesforce.com," a "disableElement" framework action is generated with an id argument "phSearchButton." When this framework policy is implemented, the search button on the salesforce.com webpage is disabled.

Framework Policy C:

```
"onBodyClick":[
    {
        "action": "externalProcess",
        "domain": ".",
        "commandLine": "say %text% %title%"
    }
]
```

According to Framework Policy C, when a "bodyClick" framework event is received at the framework server, an "externalProcess" framework action is generated with a commandLine argument "say %text% %title%." The "." domain parameter can indicate that the domain name is irrelevant for this particular framework event and/or action. Upon implementing Framework Policy C, when a user clicks on any element on a webpage, the computing device speaks out the text of the element.

Framework Policy D:

```
"onExternalEvents": [
    {
        "action": "closeTab",
        "domain": "external:sessionChanged",
        "tabUrl": "https://"
    }
]
```

According to Framework Policy D, when an external event is received with a domain parameter "external:sessionChanged" at the framework server, a "closeTab" framework action is generated with a tabUrl argument "https://." The "external:sessionChanged" domain parameter can be treated as a pseudo domain name. The "https://" tabUrl argument can indicate the "closeTab" action applies to all tabs when an URL starts with "https://". Upon implementing Framework Policy C, when a user's secure session changes, the web browser closes all tabs of secure webpages.

Framework Policy E:

```
"onPageLoaded":[
    {
        "action": "settings",
        "domain" : "www.bbc.co.uk",
        "windowsRegistry" :
        {
            "HKLM":[
                {
                    "key":"SOFTWARE\Policies\\Microsoft\\Internet
                           Explorer\\Main",
                    "value":"EnableAutoUpgrade",
                    "data": "0",
                }
            ],
            "HKCU":[
                {
                    "key":"Software\\Microsoft\\Internet Explorer\\Main",
                    "value":"Anchor Underline",
                    "data": "hover",
                },
                {
                    "key":"Software\\Microsoft\\Internet Explorer\\Main",
                    "value":"Use FormSuggest",
                    "data": "no",
                },
                {
                    "key":"Software\\Microsoft\\Internet Explorer\\Main",
                    "value":"FormSuggest Passwords",
                    "data": "no",
                },
                {
                    "key":"Software\\Microsoft\\Internet Explorer\\Main",
                    "value":"DisableScriptDebuggerIE",
                    "data": "yes",
                },
                {
                    "key":"Software\\Microsoft\\Internet Explorer\\Main",
                    "value":"DisableScript Debugger",
                    "data": "yes",
                }
            ]
        }
    }
]
```

According to Framework Policy E, when a "page loaded" framework event is received at the framework server with a domain parameter "www.bbc.co.uk," a "settings" framework action is generated with a windows registry argument for modifying a number of registry entries associated with an Internet Explorer browser. Within the HKLM registry, "EnableAutoUpgrade" is set to "0," which disables auto-checking for a new version of Internet Explorer. Within the HKCU registry, "Anchor Underline" is set to "hover," resulting in anchors being underlined; "Use FormSuggest" is set to "no," disabling auto-form completion; "FormSuggest Passwords" is set to "no," disabling caching of passwords; and both "DisableScriptDebuggerIE" and "Disable Script Debugger" are set to "yes," disabling the JavaScript debuggers.

Following these modifications, as part of the execution of the "settings" framework action, a command may be sent to Internet Explorer to refresh and reload the page with the modified settings. For example, the following instruction may be passed to Internet Explorer:

```
SendMessageTimeout(
    HWND BROADCAST,
    WM SETTINGCHANGE,
    NULL,
    (LPARAM) "Policy",
    SMTO ABORTIFHUNG,
    2000,
    NULL
);
```

As described above, the instructions associated with Framework Policy E may further include recording the existing browser settings before they are modified and restoring the original settings after the relevant browser window or tab is closed.

Framework Policy F:

```
"onPageLoaded":[
    {
        "action": "settings",
        "domain" : "www.bbc.co.uk",
        "googleChrome" :
        {
            "bookmarks":[
                "http ://www.bbc.co.uk",
                "http ://google.co.uk"
            ],
            "database": [
                {
                    "key": "enable do not track",
                    "value": true,
                }
            ]
        }
    }
]
```

According to Framework Policy F when a "page loaded" framework event is received at the framework server with a domain parameter "www.bbc.co.uk," a "settings" framework action is generated with a Google Chrome argument for modifying settings and SQL database entries associated with the Chrome browser. http://www.bbc.co.uk and http://google.co.uk are added as bookmarks. Changes are made to the database, including setting the "enable do not track" key to "true," to disable browser tracking.

Following these modifications, as part of the execution of the "settings" framework action, a command may be sent to Chrome to refresh and reload the page with the modified settings. As described above, the instructions associated with Framework Policy F may further include recording the existing browser settings before they are modified and restoring the original settings after the relevant browser window or tab is closed.

Figure 9:
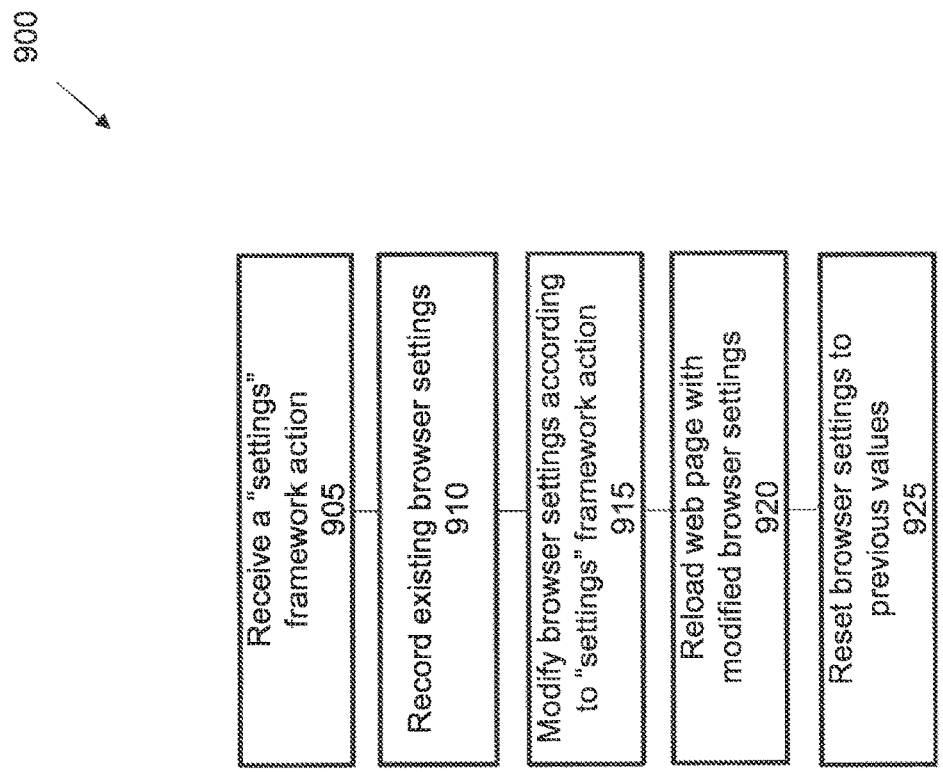
FIG. 9 illustrates an exemplary execution of an exemplary framework action in accordance with some embodiments.

FIG. 9 illustrates a method 900 for execution of a "settings" framework action such as those associated with Framework Policies E and F. When the system receives settings framework action (905), optionally and in some embodiments, the system may first record the current browser settings so that these settings can be reset later (910). In some implementations, the system may determine which settings are to be modified by the framework action and record only those settings; alternatively a broader set of browser settings may be recorded regardless of which specific settings a particular framework action includes.

Once the current browser settings are (optionally) recorded, the values are modified according to the settings specified by the policy and the generated framework action (915). This modification may occur according to any of the mechanisms discussed herein—either by the browser plugin directly or by use of an external application. At least one web page is subsequently loaded or reloaded with the modified browser settings (920). Subsequently, the browser may be reset to its previous settings if they were recorded or can otherwise be determined (925).

The web event framework described herein allows the above method 900 to be carried out for a browser window easily and automatically, without any need for user intervention. Prior attempts to change browser settings when the user visits a particular website typically required the user to perform specific actions—either manually changing the settings, or providing permission for an untrusted script to do so—and then manually refresh the web page. The web event framework provides a fully automated alternative.

If the framework action determiner 620 does not know how to handle a received framework event, it can be configured to ignore this framework event. Optionally, an alert (e.g., an error message) can be generated and sent to users and/or administrators.

Referring now to the framework plugin 210 in FIG. 5, the framework action executor 550 can execute a framework action, e.g., received from a framework server; the webpage updater 560 can generate or update a webpage based on the framework action received from a framework server. In one example, the framework action executor 550 can execute the "closeTab" action illustrated in Framework Policy D—closing tabs of secure webpages. In another example, the webpage updater 560 can coordinate with the framework action executor 550 to execute the "disableElement" action illustrated in Framework Policy B—disabling the search button on the saleforce.com webpage. If the framework action executor 550 does not know how to handle a received framework action, it can be configured to ignore this framework action. Optionally, an alert (e.g., an error message) can be generated and sent to users and/or administrators.

According to embodiments of the disclosed subject matter, a web event framework can reduce system complexity. For example, the framework server 220 and the framework plugin 210 can be implemented free of complex business logic. The framework server 220 can simply be an event sink, receiving framework events from all event sources and determining framework actions based on the framework policy. According to embodiments of the disclosed subject matter, a web event framework can also improve flexibility and maintainability. For example, changing a framework policy itself can change the behaviors of a web event framework without modifying the framework server 220 and/or the framework plugin 210. According to embodiments of the disclosed subject matter, a web event framework can also increase extendibility. For example, adding framework events to a framework policy can expand the list of events handled by a web event framework without updating the framework server 220 and/or the framework plugin 210.

Referring back to the framework server 220 in FIG. 6, the policy store interface 660 can allow the framework server 220 to retrieve or save a framework policy from/to a policy store (e.g., 230). A policy store can reside locally on the same computing device as the framework server 220 or remotely on a different computing device. The framework policy configurator 670 can configure the framework server 220, e.g., based on a framework policy. In some embodiments, the framework policy configurator 670 can also customize a framework policy based on a user's or administrator's needs.

Figure 7:
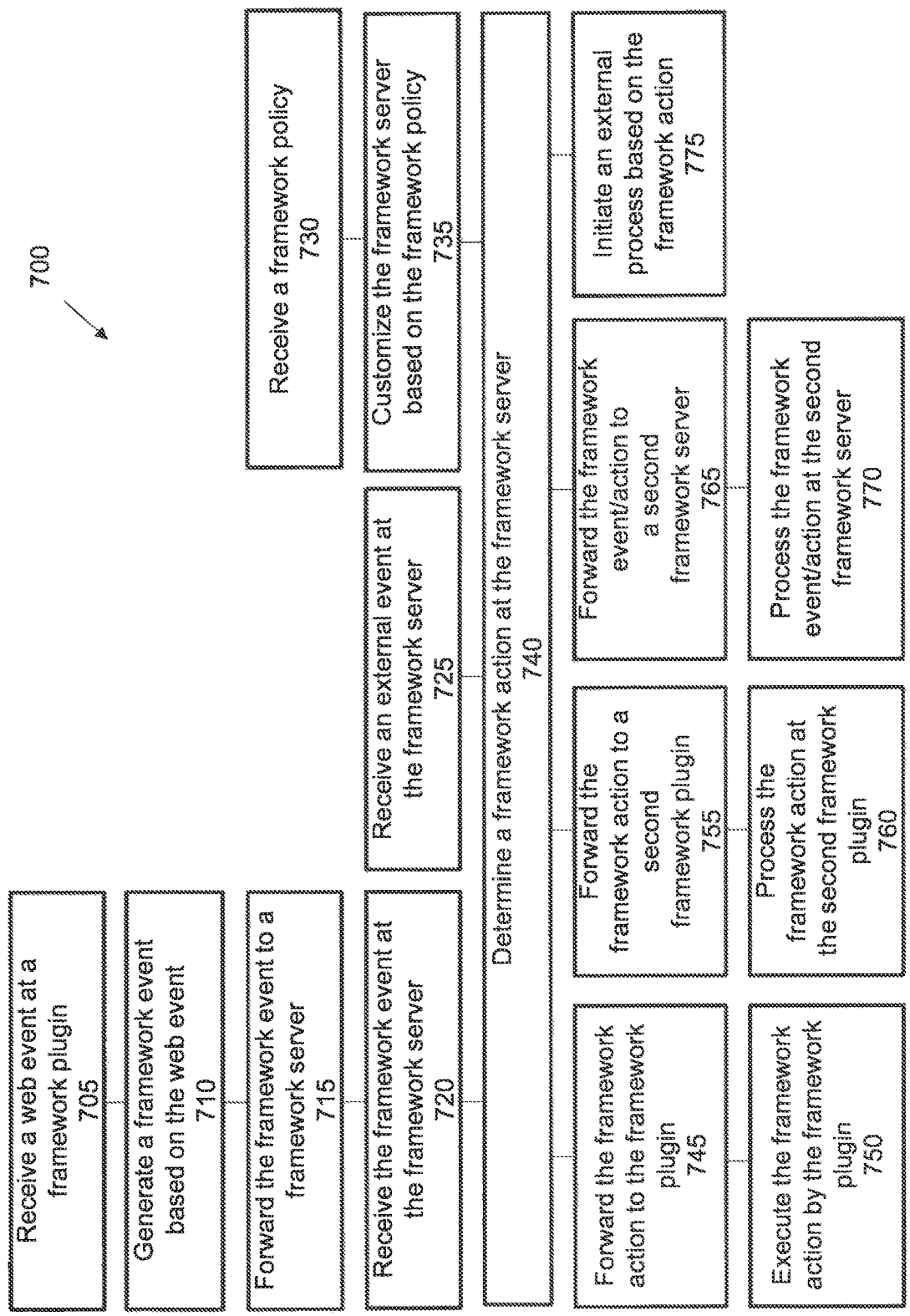
FIG. 7 includes an exemplary operation of an exemplary web event framework in accordance with some embodiments.

FIG. 7 illustrates an exemplary operation 700 of an exemplary web event framework according to certain embodiments of the disclosed subject matter. The operation 700 can be modified by, for example, having stages rearranged, changed, added and/or removed.

At stage 705, a web event can be received at a framework plugin (e.g., 210). The web event can be received from a web browser (e.g., 202) associated with the framework plugin. For example, a "Before Navigate" web event can be received when a web browser is about to navigate to a new webpage.

At stage 710, a framework event can be generated based on the web event. The framework event can be generated by the framework plugin (e.g., 210). For example, a "navigate" framework event can be generated in response to a "Before Navigate" web event. If the framework plugin does not recognize a received web event, the web event can be ignored. Optionally, an alert (e.g., an error message) can be generated and sent to users and/or administrators.

At stage 715, the framework event can be forwarded to a framework server (e.g., 220). The framework server 220 can be independent from and not associated with any web browser (e.g., 202). In one example, the framework server 220 can reside locally on the same computing device as the framework plugin 210 or browser 202; in another example the framework server 220 can reside remotely on a different computing device (e.g., over a network). The communication between a framework plugin and a framework server can be synchronous or asynchronous, e.g., based on a framework policy.

At stage 720, the framework event can be received at the framework server (e.g., 220). The framework event can be received from one or more framework plugins from a local or remote computing devices.

Alternatively or additionally, at stage 725, an external event can be received at the framework server (e.g., 220). The external event can be received from an external event source on a local or remote computing device. For example, the framework server 220 can receive a time event via the external event interface 630 from a system clock module indicating the time is 9 AM or 5 PM.

Optionally, at stage 730, a framework policy can be received. A framework policy can define how the framework server 220 determines a framework action based on an event. A framework policy can be received from a policy store (e.g., 230), which can reside either locally on the same computing device as the framework server 220 or remotely on a different computing device. At stage 735, the framework server (e.g., 220) can be customized, e.g., based on the framework policy received. In some embodiments, the framework policy configurator 670 can customize the framework server based on a framework policy.

At stage 740, a framework action can be determined at the framework server (e.g., 220). The framework action can be determined based on a framework event and/or an external event. The determination of a framework action can also be based on a framework policy as discussed earlier in this document. If the framework server does not recognize a received event, the event (framework event or external event) can be ignored. Optionally, an alert (e.g., an error message) can be generated and sent to users and/or administrators.

At stage 745, the framework action can be forwarded to the framework plugin, e.g., by the framework server. In some embodiments, the framework plugin can be the same framework plugin where the corresponding framework event originates.

At stage 750, the framework action can be executed by the framework plugin. The framework plugin can execute the framework action immediately, after a certain delay, or upon certain triggering event. The timing of execution can be customized and can be defined in a framework policy. In some embodiments, the framework action can be executed by the framework action executor 550 and/or webpage updater 560. If the framework plugin does not recognize a received framework action, the framework action can be ignored. Optionally, an alert (e.g., an error message) can be generated and sent to users and/or administrators.

Alternatively or additionally, at stage 755, the framework action can be forwarded to a second framework plugin, e.g., by the framework server. In some embodiments, the second framework plugin can be different from the framework plugin where the corresponding framework event originates.

At stage 760, the framework action can be executed by the second framework plugin. The second framework plugin can execute the framework action immediately, after a certain delay, or upon certain triggering event. The timing of execution can be defined in a framework policy. In some embodiments, the framework action can be customized and can be executed by the framework action executor 550 and/or webpage updater 560 in the second framework plugin. If the second framework plugin does not recognize a received framework action, the framework action can be ignored. Optionally, an alert (e.g., an error message) can be generated and sent to users and/or administrators.

Alternatively or additionally, at stage 765, the framework action or event can be forwarded to a second framework server, e.g., by the framework server. In some embodiments, the second framework server can reside remotely and can communicate with other peer framework servers over a network.

At stage 770, the framework action or event can be processed by the second framework server. When the second framework server receives a framework action from the framework server, the second framework server can forward to a second framework plugin associated with the second framework server. When the second framework server receives a framework event from the framework server, the second framework server can determine a second framework action based on the received framework event and a second framework policy, then forward the determined framework action to the second framework plugin associated with the second framework server. The second framework plugin can then execute the framework action received from the second framework server.

Alternatively or additionally, at stage 775, an external process can be initiated. The external process can be initiated based on the framework action. The external process can also be initiated based on a framework policy.

Figure 8:
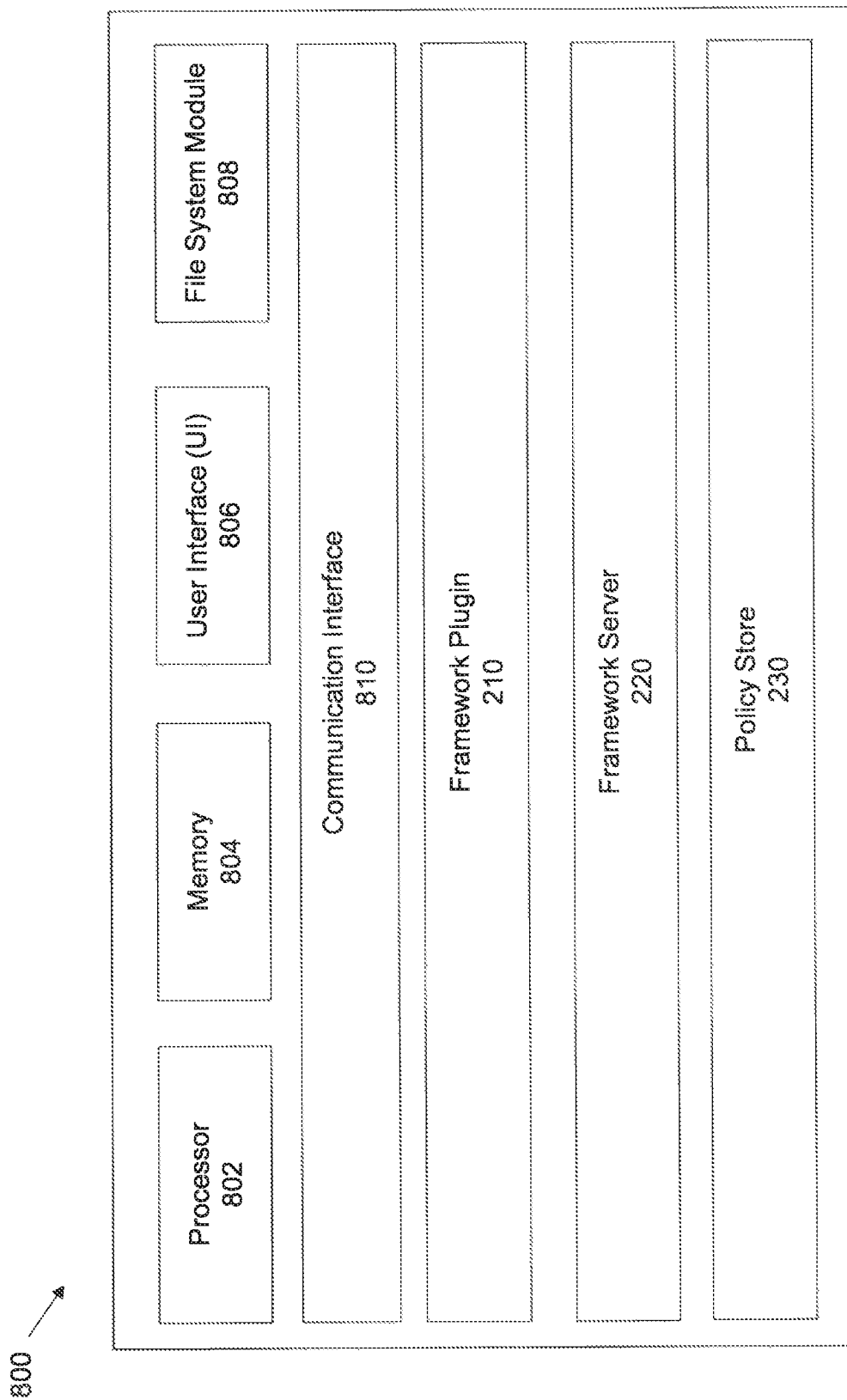
FIG. 8 illustrates a block diagram of an exemplary computing device in accordance with some embodiments.

FIG. 8 illustrates a block diagram of an exemplary computing device 800 according to certain embodiments of the disclosed subject matter. The computing device 800 can include at least one processor 802 and at least one memory 804. The processor 802 can be hardware that is configured to execute computer readable instructions such as software. The processor 802 can be a general processor or be an application specific hardware (e.g., an application specific integrated circuit (ASIC), programmable logic array (PLA), field programmable gate array (FPGA), or any other integrated circuit). The processor 802 can execute computer instructions or computer code to perform desired tasks. The memory 804 can be a transitory or non-transitory computer readable medium, such as flash memory, a magnetic disk drive, an optical drive, a programmable read-only memory (PROM), a read-only memory (ROM), a random access memory (RAM), or any other memory or combination of memories.

The computing device 800 can also optionally include a user interface (UI) 806, a file system module 808, and a communication interface 810. The UI 806 can provide an interface for users to interact with the computing device 800 in order to access the web event framework arrangement 200/300/400. The file system module 808 can be configured to maintain a list of all data files, including both local data files and remote data files, in every folder in a file system. The file system module 808 can be further configured to coordinate with the memory 804 to store and cache files/data. The communication interface 810 can allow the computing device 800 to communicate with external resources (e.g., a network or a remote client/server). The computing device 800 can also include a framework plugin 210, a framework server 220, and a policy store 230. The description of the framework plugin 210, the framework server 220, and the policy store 230 and their functionalities can be found in the discussion of FIGS. 1-7. The computing device 800 can include additional modules, fewer modules, or any other suitable combination of modules that perform any suitable operation or combination of operations.

It is to be understood that the disclosed subject matter is not limited in its application to the details of construction and to the arrangements of the components set forth in the following description or illustrated in the drawings. The disclosed subject matter is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods, and systems for carrying out the several purposes of the disclosed subject matter. It is important, therefore, that the claims be regarded as including such equivalent constructions insofar as they do not depart from the spirit and scope of the disclosed subject matter.

Although the disclosed subject matter has been described and illustrated in the foregoing exemplary embodiments, it is understood that the present disclosure has been made only by way of example, and that numerous changes in the details of implementation of the disclosed subject matter may be made without departing from the spirit and scope of the disclosed subject matter, which is limited only by the claims which follow.

A "server," "client," "agent," "module," "interface," and "host" is not software per se and includes at least some tangible, non-transitory hardware that is configured to execute computer readable instructions. In addition, the phrase "based on" does not imply exclusiveness—for example, if X is based on A, X can also be based on B, C, and/or D.

What is claimed is:

1. An apparatus, comprising:
a memory; and
a processor operatively coupled to the memory, the processor configured to:
receive a page loaded framework event from a compute device, the page loaded framework event indicating that a page having a domain parameter is loaded on a browser running on the compute device, the browser including initial settings;
further receive an external event indicating a characteristic of the compute device;
identify, based on the page loaded framework event and the external event, a policy that is associated with the domain parameter and that defines modified settings to be used reload the page;
generate an executable file based on the policy, the executable file including action instructions to:
change the initial settings of the browser to the modified settings;
send to the browser a reload instruction to reload the page using the modified settings; and
initiate an external process related to the external event in the browser; and
send the executable file to the compute device such that the compute device, in response to receiving the executable file, executes the action instructions.

2. The apparatus of claim 1, wherein the executable file further includes action instructions to:
store, prior to execution of the action instructions to change the initial settings, the initial settings; and
reset, after execution of the action instructions to initiate an external process, the initial settings for the browser.

3. The apparatus of claim 1, wherein the policy is further associated with a type of the browser.

4. The apparatus of claim 1, wherein the page loaded framework event identifies a user of the compute device, and the policy is further associated with the user of the compute device.

5. The apparatus of claim 1, wherein the initial settings includes at least one of: a setting associated with a visual element of the page, a setting defining a security element, a setting providing auto-complete functionality, or a setting providing debugging functionality.

6. The apparatus of claim 1, wherein:
the external event includes a determination that a plugin associated with the browser has been disabled;
the plugin is configured to detect that the page is loaded on the browser, and cause the compute device to generate the page loaded framework event; and
in response to determining that the plugin being disabled, the external process includes termination of a functionality associated with the browser.

7. The apparatus of claim 1, wherein one of the modified settings includes a change to a database entry.

8. A non-transitory processor-readable medium storing code representing instructions to be executed by a processor, the code comprising code to cause the processor to:
receive a page loaded framework event from a first compute device running a first browser, the page loaded framework event indicating that a first instance of a page having a domain parameter is loaded on the first browser, the first browser including first settings;
further receive an external event indicating a characteristic of the first compute device;
identify, based on the page loaded framework event and the external event, a policy defining second settings for a second browser;
generate an executable file based on the policy, the executable file including action instructions to:
change the first settings to the second settings of the policy;
send to the second browser a load instruction to load a second instance of the page on the second browser with the second settings; and
initiate an external process related to the external event in the second browser; and
send the executable file to a second compute device running the second browser such that the second compute device, in response to receiving the executable file, executes the action instructions.

9. The non-transitory processor-readable medium of claim 8, wherein the executable file further includes action instructions to:
store, prior to execution of the action instructions to change the first settings, the first settings; and
reset, after execution of the action instructions to initiate an external process, the first setting.

10. The non-transitory processor-readable medium of claim 8, wherein the policy is associated with at least one of: a type of the first browser, a type of the second browser, or a user of the second compute device.

11. The non-transitory processor-readable medium of claim 8, wherein the first settings include: a setting associated with a visual element of the page, a setting defining a security element, a setting providing auto-complete functionality, or a setting providing debugging functionality.

12. The non-transitory processor-readable medium of claim 8, wherein the first browser and the second browser are different types of browsers.

13. The non-transitory processor-readable medium of claim 8, wherein:
the policy is a first policy and the executable file is a first executable file; and
the code further comprises code to cause the processor to:
identify, based on the page loaded framework event and the external event, a second policy defining a stored settings configuration associated with the first browser;
generate a second executable file based on the second policy; and
send the second executable file to the first compute device running the first browser such that the first compute device, in response to receiving the second executable file, reloads the first instance of the page using the stored settings configuration.

14. An apparatus, comprising:
a memory; and
a processor operatively coupled to the memory and configured to execute a plugin associated with a browser, the processor configured to:
generate, in response to detecting a first page being loaded on the browser, a first page loaded framework event indicating the first page being loaded;
further generate a first external event indicating a first device characteristic;
send the first page loaded framework event and the first external event to a compute device such that the compute device, in response to receiving the first page loaded framework event and the first external event, generates a first executable file based on a first policy associated with the first page;
execute, in response to receiving the first executable file, the first executable file to:
change first settings for the browser to first modified settings of the first policy to collectively produce a first settings configuration;
cause, after the changing the first settings, the browser to load the first page with the first settings configuration; and
initiate a first external process related to the first external event;

generate, in response to detecting a second page being loaded on the browser, a second page loaded framework event indicating the second page being loaded;

further generate a second external event indicating a second device characteristic;

send the second page loaded framework event and the second external event to the compute device such that the compute device, in response to receiving the second page loaded framework event and the second external event, generates a second executable file based on a second policy associated with the second page; and execute, in response to receiving the second executable file, the second executable file to:
    change second settings for the browser to second modified settings of the second policy to collectively produce a second settings configuration;
    cause, after the changing the second settings, the browser to load the second page with the second settings configuration; and
    initiate a second external process related to the second external event.

15. The apparatus of claim 14, wherein the processor is configured to execute the first executable file to further:
    store the first settings prior to the changing the first settings; and
    reset the first modified settings after the causing the browser to load the first page.

16. The apparatus of claim 14, wherein the first policy and the second policy are further associated with a type of the browser.

17. The apparatus of claim 14, wherein the first policy and the second policy are further associated with a user of a compute device running the browser.

18. The apparatus of claim 14, wherein the first settings includes: a setting associated with a visual element of the first page, a setting defining a security element, a setting providing auto-complete functionality, or a setting providing debugging functionality.

19. The apparatus of claim 14, wherein the first settings include at least one setting that is not included in the second settings.

* * * * *